Figure 1:
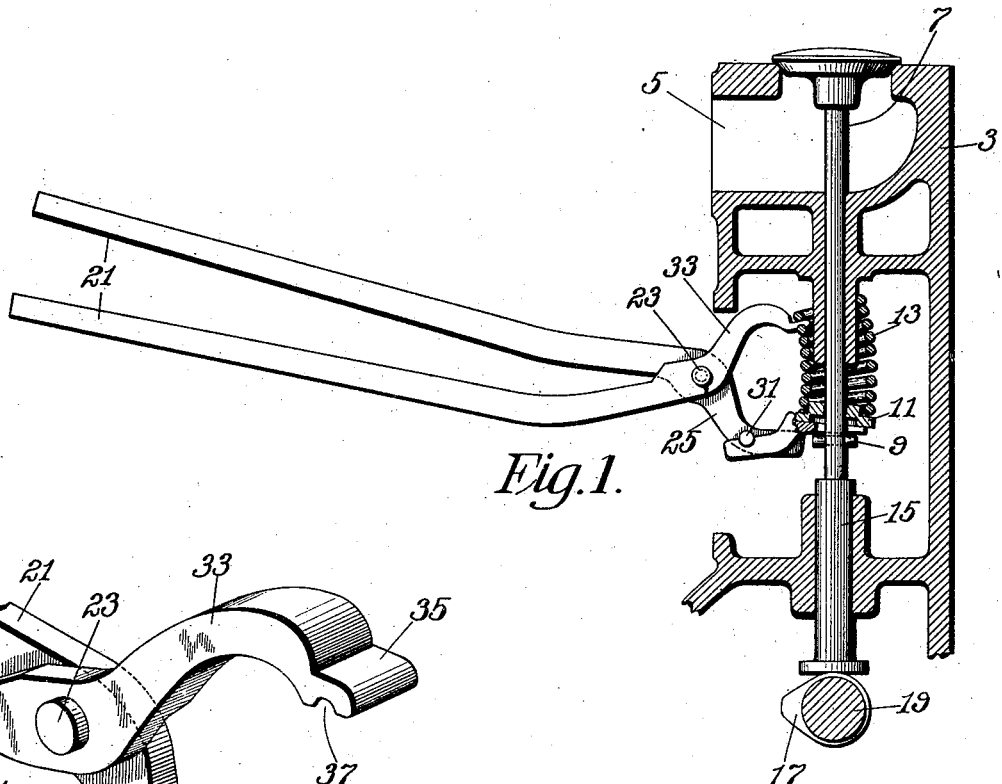

H. W. CODDINGTON.
VALVE SPRING COMPRESSOR.
APPLICATION FILED NOV. 5, 1920.

1,400,027.

Patented Dec. 13, 1921.

Inventor.
Harry W. Coddington
by Fred W. Guibord
Atty.

UNITED STATES PATENT OFFICE.

HARRY W. CODDINGTON, OF NATICK, MASSACHUSETTS.

VALVE-SPRING COMPRESSOR.

1,400,027.  Specification of Letters Patent.  Patented Dec. 13, 1921.

Application filed November 5, 1920. Serial No. 422,039.

*To all whom it may concern:*

Be it known that I, HARRY W. CODDINGTON, a citizen of the United States, residing at Natick, in the county of Middlesex and State of Massachusetts, have invented certain Improvements in Valve-Spring Compressors, of which the following description, in connection with the accompanying drawings, is a specification, like reference characters on the drawings indicating like parts in the several figures.

This invention relates to a tool for facilitating the removal and replacement of the spring of a valve such as the puppet valve of an internal combustion engine.

The valves of an automobile engine are ordinarily of the puppet type, each valve being normally held closed by a spring and being opened in opposition to the action of the spring by some rigid member such as a tappet or rocker arm. Near that end of the stem of the valve which is remote from its head is a hole through which loosely extends a pin, against this pin rests a washer, and against the washer the spring. In order to remove the valve from the engine it is necessary first to compress the spring by forcing the washer against it and then to pull out the washer-supporting pin; and in order to replace the valve the spring must be again compressed. Hitherto tools for compressing the spring by forcing the washer against it have commonly comprised two members, one for engaging the washer and the other for engaging some rigid part of the engine. With such tools, however, the procedure in removing and replacing a valve is slow and laborious owing to the fact that the tools have not been capable of holding the spring and washer in assembled relation with the spring compressed when the spring and washer are dissociated from the engine.

According to the present invention a tool is provided having a washer-engaging member and a member for engaging a coil of the spring and means for causing relative approach of the members. Conveniently the tool may comprise a pair of tongs one jaw of which is provided with a depression to receive the washer and the other with a groove to receive a coil of the spring. With such a construction the spring and washer may be compressed and, after the pin has been pulled out and the valve removed, the spring and washer still held in compressed relation removed from the engine. And when it is desirable to replace the valve, the spring and washer may be grasped and held in assembled relation with the spring compressed while they are put back into place.

These and other features of the invention will be described as embodied in an illustrative device and pointed out in the appended claims.

Referring now to the accompanying drawings:—

Figure 2:
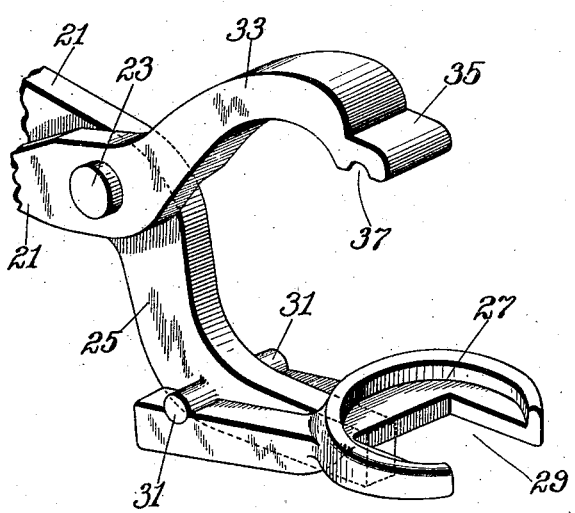

Figure 1 is a side elevation of a tool in which the present invention is embodied, a part of an engine being shown with the tool grasping the washer and spring, and Fig. 2 is a perspective of the tool.

Part of the engine casting of a Ford automobile is shown in section at 3. The head of the valve has a conical face which, when the valve is in closed position, rests upon a conical seat at the upper end of a port 5. The stem 7 of the valve extends down through a suitable bearing in the casting and has passing loosely through its lower end a short washer-supporting pin 9. Normally resting upon this pin is a spring-supporting washer 11 having a depression or recess in its under side the diameter of which is slightly greater than the length of the pin so that the pin may be received in the depression but is prevented by the vertical walls of the depression from sliding out of the stem 7 of the valve. Resting upon the washer and encircling the stem of the valve is a coiled spring 13, the upper end of which normally bears against the casting. The valve is thus normally held closed by the spring which acts through the washer and pin upon the stem of the valve. In order to raise the valve at proper intervals a tappet 15 slidably mounted in the casting has a head which rests upon a cam 17, said cam being fast to a rotary shaft 19. The general construction which has been briefly outlined is used in most internal combustion engines although there are many variations in it.

In order to remove the valve when, for example, it becomes necessary to grind it or to replace it by a new one, the washer 11 must be forced upwardly and the pin 9, or other washer-supporting member, of which there are different forms, pulled out. The spring 13 is stiff and consequently various tools have been provided for this purpose.

The tool of the present invention comprises a pair of tongs consisting of the usual two levers pivoted together, the portions of the levers on one side of the pivot being formed as handles and the portions on the other side of the pivot being jaw-carrying arms. In the illustrated tool the handles are indicated at 21 and the pivot at 23. One jaw-carrying arm 25 has a removable and replaceable jaw mounted upon it, said jaw having a depression 27 circular in outline and shaped to receive the washer 11 and to confine it so that it cannot move sidewise. This jaw is also provided with an open-ended slot 29 to permit it to straddle the valve stem. This jaw rests upon the arm 25 and has integral with it a rearwardly extending yoke which straddles the arm, the forks of the yoke having alined grooves to engage a pin 31 which is carried by the arm 25. With this construction the jaw may readily be removed at any time and replaced by one of a different size. The spring-supporting washers vary considerably in size and shape in different engines; and this removable and replaceable jaw construction is provided to permit the tool to be readily adapted to any particular shape and size of washer, it being understood that a set of removable jaws for the arm 25 may be part of the equipment of each tool. On the other hand, if the tool is to be furnished for use entirely with a particular engine, the jaw may, if desired, be made integral with the arm 25. The other arm 33 has an integral jaw comprising a flattened portion 35, which is shaped so that it may be thrust between the coils of the spring, said jaw being provided on that side which faces the other jaw with a depression in the form of a transverse groove 37 to receive a coil of the spring.

When it is desired to remove and replace the valve 7, the operator inserts the lower jaw beneath the washer 11 so that the washer is received in the depression 27 and at the same time thrusts the upper jaw between two coils near the upper end of the spring so that one coil is received in the groove 37. He now squeezes the handles with the result shown in Fig. 1, and while the spring is held compressed, pulls out the pin 9 and removes the valve. The tongs may then be manipulated bodily to remove the washer and spring, still in assembled relation, from the engine and to lay them upon a bench if desired while the valve is being ground. When it is desired to replace the valve, all the operator has to do is to place the washer and spring in assembled relation again, if they have not remained so, mount them in the jaws, squeeze the handles and put them back into the position shown in Fig. 1. The valve may then be replaced and the pin 9 thrust back into the hole in the valve stem, the handles released and the tool removed.

By reason of the fact that the washer and spring may be held in assembled relation with the spring compressed to any desired degree, it will be seen that the handling of these parts is greatly facilitated and the operations of removing and replacing a valve rendered much more simple than has hitherto been the case.

It should be understood that although the tool has been shown and described in connection with an engine of the Ford type, the use of the tool is not confined to any particular type of engine. For example with an engine of the Oakland type having overhead valves, the old tool, which has been described above, is entirely useless either in removing or replacing a valve since, after the rocker arm which actuates the valve from above has been removed, as it must be before the valve can be removed, there is no rigid part of the engine located above the valve stem and consequently nothing against which the thrust of the spreading forks of the old tool can be supported. The tool of the present invention, however, is not dependent upon any rigid part of the engine and is particularly adapted for use with the overhead type of valve.

Having thus described my invention, what I claim as new and desire to secure by Letters Patent of the United States is:

1. A tool for handling the spring and spring-supporting washer of a puppet valve, comprising a washer-engaging member, a member adapted to be thrust between the coils of the spring and having a groove to engage one of them, and means for causing the members to be moved toward each other whereby the spring may be held compressed and while so held removed or replaced.

2. A tool for handling the spring and spring-supporting washer of a puppet valve, comprising a pair of tongs, one jaw of the tongs being cut away to permit it to straddle the stem of the valve and being formed with a depression to receive the washer, the other jaw having a depression to receive a coil of the spring.

3. A tool for handling the spring and spring-supporting washer of a puppet valve, comprising a pair of tongs, one jaw of which projects beyond the other, the projecting jaw being shaped to engage the washer and the other jaw being shaped to engage a coil of the spring.

4. A pair of tongs, one jaw of which has a flattened, enlarged portion provided with a circular depression and an open-ended slot, the other jaw being provided on that side which faces the first-named jaw with a transverse groove.

5. A pair of tongs comprising levers pivoted together, the portions on one side of the pivot being formed as handles and those on the other side as jaw-carrying arms, one of said arms having its jaw rigid with it, the other arm being formed with an abutment, and a readily detachable jaw resting on said last-named arm and having engagement with said abutment.

In testimony whereof I have signed my name to this specification.

HARRY W. CODDINGTON.